United States Patent
Higgins

(10) Patent No.: US 12,502,720 B2
(45) Date of Patent: Dec. 23, 2025

(54) TABLE SAW WITH GRAVITY RISE STAND

(71) Applicant: Robert Bosch GmbH, Stuttgart (DE)

(72) Inventor: Hannah M. Higgins, Batavia, IL (US)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 18/545,803

(22) Filed: Dec. 19, 2023

(65) Prior Publication Data
US 2025/0196239 A1    Jun. 19, 2025

(51) Int. Cl.
  *B23D 47/02*   (2006.01)
  *B25H 1/04*    (2006.01)

(52) U.S. Cl.
  CPC ............. *B23D 47/025* (2013.01); *B25H 1/04* (2013.01)

(58) Field of Classification Search
  CPC ................................ B23D 47/025; B25H 1/04
  See application file for complete search history.

(56) References Cited

U.S. PATENT DOCUMENTS

| | | | |
|---|---|---|---|
| 5,087,013 A | 2/1992 | Gress et al. | |
| 6,848,684 B2* | 2/2005 | Fortin | B25H 1/04 269/220 |
| 7,077,421 B2 | 7/2006 | Wu | |
| 7,090,210 B2* | 8/2006 | Lawrence | B62B 1/12 29/559 |
| 7,222,865 B2 | 5/2007 | Chen et al. | |
| D550,476 S | 9/2007 | Liu et al. | |
| 7,487,947 B2 | 2/2009 | Liu et al. | |
| 7,588,255 B2* | 9/2009 | Katz | B62B 1/12 280/47.27 |
| 8,313,076 B2 | 11/2012 | Tam et al. | |
| 8,454,717 B2 | 6/2013 | Lin | |
| 8,464,994 B2 | 6/2013 | Chiu | |
| 8,910,970 B2 | 12/2014 | Chen | |
| 9,149,926 B2 | 10/2015 | Chen | |
| 9,186,736 B1* | 11/2015 | Chang | B62B 1/10 |
| 10,005,178 B1 | 6/2018 | Chou et al. | |

(Continued)

FOREIGN PATENT DOCUMENTS

| | | |
|---|---|---|
| CN | 2802248 Y | 8/2006 |
| CN | 100398266 C | 7/2008 |

(Continued)

*Primary Examiner* — Sean M Michalski
(74) *Attorney, Agent, or Firm* — Maginot, Moore & Beck LLP

(57) ABSTRACT

A table saw system includes a table saw, and a stand including a table saw coupling assembly, an intermediate support pivotably coupled to the coupling assembly, and a lower support pivotably coupled to the intermediate support through a second pivot. A longitudinal support pivotably connects to the coupling assembly through a third pivot, and pivotably connects to the lower support through a fourth pivot. The stand is alternatively movable from an intermediate position to a closed position whereat the table saw is vertically oriented, or an open position, whereat the table saw is horizontally oriented, without passing through the other of the closed and open position. The table saw is vertically oriented in the intermediate position with the second pivot closer to a vertical plane extending through the fourth pivot than when the stand is in the closed position. Movement from the closed position to the intermediate position is automatic.

20 Claims, 5 Drawing Sheets

(56) References Cited

U.S. PATENT DOCUMENTS

| | | | |
|---|---|---|---|
| 11,027,411 B2 | 6/2021 | Van Bergen et al. | |
| 11,548,137 B2* | 1/2023 | Van Bergen | B25H 1/16 |
| 2004/0051224 A1* | 3/2004 | Fortin | B25H 1/04 |
| | | | 269/139 |
| 2004/0187666 A1* | 9/2004 | Huang | B23D 47/025 |
| | | | 83/477.2 |
| 2007/0012826 A1 | 1/2007 | Liu et al. | |
| 2008/0067786 A1* | 3/2008 | Liu | B25H 1/04 |
| | | | 24/1 |
| 2012/0313351 A1* | 12/2012 | Chen | B25H 1/04 |
| | | | 248/676 |
| 2021/0022530 A1 | 1/2021 | Born et al. | |
| 2022/0032445 A1* | 2/2022 | Groves | B25H 1/04 |
| 2024/0042538 A1* | 2/2024 | Pechstein | B23G 1/24 |

FOREIGN PATENT DOCUMENTS

| | | |
|---|---|---|
| CN | 101745904 B | 5/2012 |
| CN | 108612992 A | 10/2018 |
| CN | 210389116 U | 4/2020 |

* cited by examiner

TABLE SAW WITH GRAVITY RISE STAND

FIELD

The present disclosure relates to power tools and more particularly to stands for power tools such as table saws.

BACKGROUND

Rolling hand trucks or support stands for large and/or heavy objects are known and are useful for transporting such objects from one location to another. Some of such known support stands are collapsible to some degree and many different designs of the hand trucks or rolling support stands are particularly suited for specific uses. While such products may be used in many different industries and applications, one noteworthy use is that of transporting objects, such as portable table saws, miter saws and the like to and from construction sites.

In the home building trade, carpenters generally have table saws as well as other types of saws that are brought to a jobsite every day in the tradesman's truck or are stored in a secure location at the jobsite and must be removed from the truck or stored location and be set up on the jobsite while work is being done. At the end of the work day, the tradesman must pack up the saw and return it to his truck or secure location for safe keeping. Because such tools are valuable, they cannot be left unattended overnight without a significant risk of theft.

There is also an issue of setting up the saw at the worksite. Even though early prior art roll stands or hand trucks may help the tradesman to move the saw to the desired location, it was often necessary to have a table or other surface, such as wooden planks resting on saw horses or the like to bring the saw to a convenient working height during use. Although more recent designs have evolved which have a rolling stand that can be unfolded to support the saw at an appropriate working height, many designs that double as a stand require the tradesman to lift a substantial portion of the weight of the saw which is typically relatively heavy.

Many portable table saws are very similar in design to standard table saws except they do not have a stand with legs beneath them and must be supported by a separate structure. Such portable table saws are rugged commercial tools that are built for an extended useful life and are therefore relatively heavy. Typical table saws of this type may weigh 60 pounds or more. While most tradesmen can usually lift 40-60 pounds, such exertion is inconvenient and perhaps dangerous in certain circumstances.

Other types of stands may unfold using a spring biasing mechanism that is released and which then supplies a major force tending to place the stand with the saw attached to it in its proper working generally horizontal position. However, stands of this type may be dangerous if the folded stand has the mechanism released when the weight of the saw is not over the stand mechanism. If there is no load on the mechanism, it can unfold very rapidly which can be quite dangerous if a tradesman or any other person is struck by the mechanism. Moreover, some configurations of the spring biasing mechanism force a user into an unbalanced stance when operating the spring biasing mechanism. This can lead to accidents.

Stands which are used with power tools such as table saws are frequently provided with support feet consisting of wing nuts, threaded rods, and metal feet surrounded by small rubber bumpers. These bumpers, however, are prone to falling off when the stand is being used or transported which leaves an exposed metal foot. Subsequent use of the stand can result in damage to finished floors on the jobsite. The metal foot is also prone to rusting and deformation because of the environmental factors of working on a jobsite A stand which is ergonomically easy to use would be beneficial. It would be further beneficial if the stand included support structures which reduced the potential for damage to underlying support structures. A stand which is robustly configured for a construction environment is further desirable.

SUMMARY

The present disclosure is directed to a system including a stand for a power tool such as a table saw. The stand includes strategically placed pivot points which utilize the weight of the saw to cause the stand to automatically move to an intermediate position from which a user can easily move the stand into an open position or a closed position.

In one embodiment, the power tool system is a table saw system including a table saw and a stand configured to support the table saw. The stand includes a table saw coupling assembly configured to couple with the table saw. An intermediate support member is pivotably coupled to the table saw coupling assembly through at least one first pivot. A lower support member is pivotably coupled to the intermediate support member through at least one second pivot. A longitudinal support member is pivotably connected to the table saw coupling assembly through at least one third pivot, and pivotably connected to the lower support member through at least one fourth pivot, Typically, two pivots are provided for each of the pivots above. The pivots are provided in a number of different forms in different embodiments. In some instances, the pivotably connected components are both movable with respect to the pivot. In some instances, the pivots fixedly connected to one of the components. The stand is configured to be movable between a closed upright position whereat the table saw is generally vertically oriented, an open position whereat the table saw is generally horizontally oriented, and an intermediate position from which the stand is alternatively movable to either of the closed upright position and the open position without passing through the other of the closed position and the open position. The table saw is generally vertically oriented in the intermediate position. The second pivot is closer to a vertical plane in which a pivot axis of the fourth pivot extends when the stand is in the intermediate position than when the stand is in the closed upright position. The stand is configured to move from the closed upright position to the intermediate position automatically when the table saw is coupled to the table saw coupling assembly.

In some embodiments, only the stand is provided.

In one or more embodiments, the stand is configured such that when the stand is in the closed upright position a minimum distance between the at least one second pivot and a vertical plane extending through the fourth pivot is ≥0.25 inches and ≤3 inches.

In one or more embodiments, a minimum distance between a horizontal plane extending through the at least one second pivot and a horizontal plane extending through the at least one fourth pivot is ≥1 inch and ≤6 inches.

In some embodiments the stand includes a tube stop assembly mounted on one of the lower support member, the intermediate support member, and the table saw coupling assembly. The tube stop assembly is configured to abut the other two of the lower support member, the intermediate support member, and the table saw coupling assembly when the stand is in a closed horizontal position to provide support and when the stand is in the closed position.

In one or more embodiments, the tube stop assembly includes a stop bolt configured to contact one of the intermediate support member and the table saw coupling assembly when the stand is in the closed horizontal position. The stop bolt provides precise positioning of the components.

In one or more embodiments, the intermediate support member has a first end portion and a second end portion opposite the first end portion. A locking pin is located at the second end portion of the intermediate support member. A locking latch is slidably connected to the lower support member and a foot actuator is pivotably connected to the lower support member and the locking latch. The locking pin and locking latch are configured to automatically lock the stand when the stand is moved to the open position. The foot actuator is configured to unlock the locking pin and locking latch when the foot actuator is moved from a first position to a second position. Additionally, the locking pin is configured to contact the lower support member in the open position.

In one or more embodiments, the stand includes a protective plate mounted on the longitudinal support. The protective plate is configured such that when the stand is in a closed horizontal position a lower edge of the protective plate extends farther downwardly than a lowermost portion of the locking latch. The lower edge is preferably rounded to provide a sliding surface in case of contact between the stand and an underlying object as the stand is moved.

In one or more embodiments, wheels are rotatably connected to the lower support member. The wheels may be connected to the lower support member in any desired manner.

In one or more embodiments, the stand includes a vertical stabilizer extending from the longitudinal support. The vertical stabilizer is configured to maintain the stand in a vertical condition when the stand is in the closed upright position and the intermediate position.

In one or more embodiments, the lower support member includes a lower leg and an upper leg. The second and fourth pivots are partially located within or coupled to the upper leg. When the stand is in the open position, the upper leg extends at a non-zero angle from the lower leg in a direction toward the table saw coupling assembly. The intermediate support member includes an upper arm and a lower arm. The first and second pivots are partially located within or coupled to the upper arm. When the stand is in the open position, the upper arm extends at a non-zero angle from the lower arm in a direction toward the table saw coupling assembly.

In one or more embodiments, a latching assembly is provided with the stand. The latching assembly is movable between a locking position at which the stand automatically locks when the stand is moved into the open position and/or when the stand is moved into the closed upright position. The stand is configured to move from the closed upright position to the intermediate position automatically when the table saw is coupled to the table saw coupling assembly and the latching assembly is moved from the locking position to the unlocked position.

In one or more embodiments the intermediate support member has a first end portion and a second end portion opposite the first end portion. The latching assembly includes a locking pin at the second end portion of the intermediate support member. A locking latch is slidably connected to the lower support member. A foot actuator pivotably connected to the lower support member and the locking latch.

In one or more embodiments, a method of operating a stand and/or a power tool system including the stand includes unlocking a latching element when the stand is in an upright closed position. The stand is configured such that upon being unlocking, the stand automatically moves to an intermediate position. From the intermediate position, the stand can be moved to either an open position or to the closed upright position.

DETAILED DESCRIPTION

Figure 1:
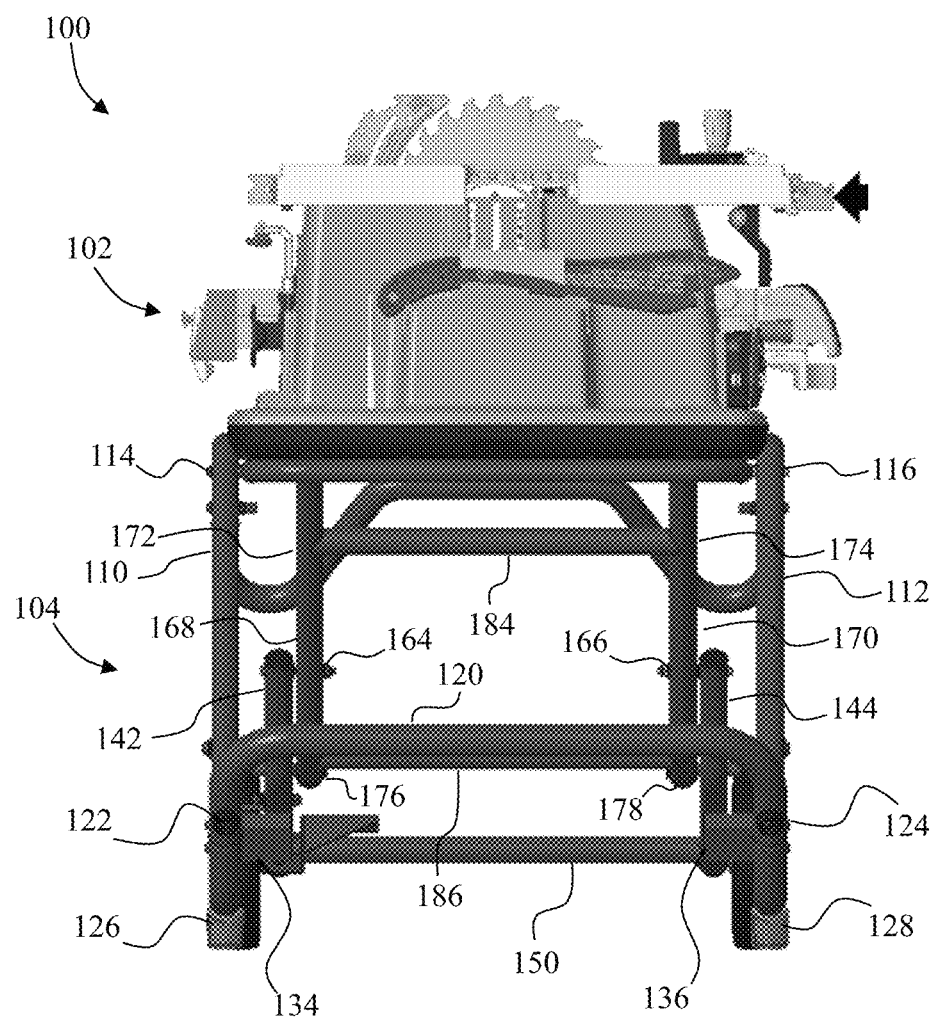
FIG. 1 shows a front plan view of a table saw assembly with the table saw in a horizontal position and the stand in an open horizontal configuration.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

FIG. 1 depicts a table saw assembly 100 which includes a table saw 102 and a stand 104. The table saw 102 is shown in a horizontal position. As used herein, a "horizontal position" of a power tool is defined as the position at which the power tool is placed when the power tool is being used to perform work. In some embodiments, the stand 104 is used with any other desired power tool such as a router, a miter saw, etc. The stand 104 is further depicted in FIG. 2 in an open configuration with the table saw 102 removed for convenience of describing the stand.

The stand 104 includes a coupling assembly 106 which includes a generally U-shaped support 108. In some embodiments, the table saw 104 is directly attached to the U-shaped support 108. In other embodiments, additional components are provided as part of the table saw coupling assembly to assist in mounting the table saw 104. For example, U.S. Pat. No. 8,047,553 describes mounting structures which may be mounted to the U-shaped support 108. Additionally, in some embodiments the support structure is rectangular.

Figure 3:
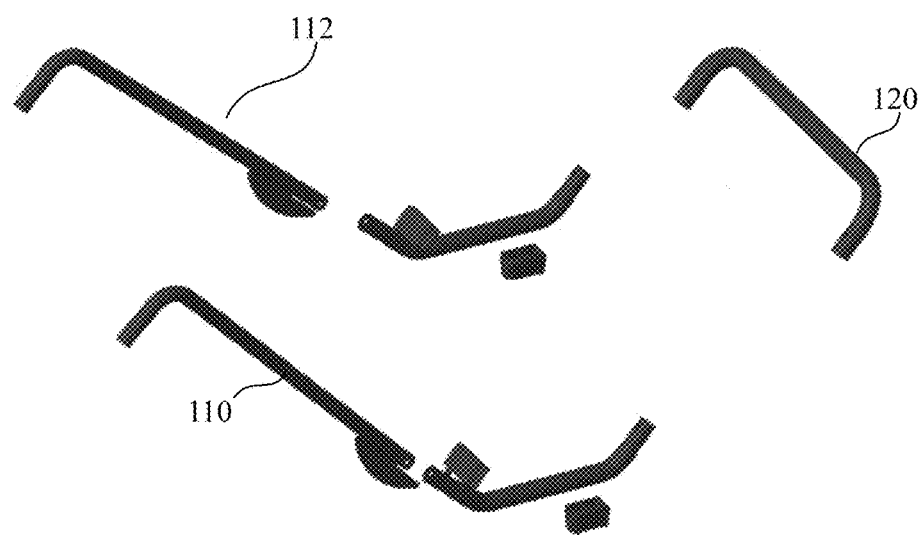
FIG. 3 shows an exploded view of the longitudinal support members and the vertical stabilizer of the table saw assembly of FIG. 1.

The coupling assembly 106 is pivotably mounted to longitudinal support members 110 and 112 through pivots 114 and 116, respectively. The longitudinal support members 110 and 112, also shown in FIG. 3, are joined at one end by a W-shaped handle 118 and at the other end by a vertical stabilizer 120. While shown as separately formed components, two or more of the longitudinal support members 110 and 112, the W-shaped handle 118, and the vertical stabilizer 120 are, in other embodiments, integrally formed.

Figure 4:
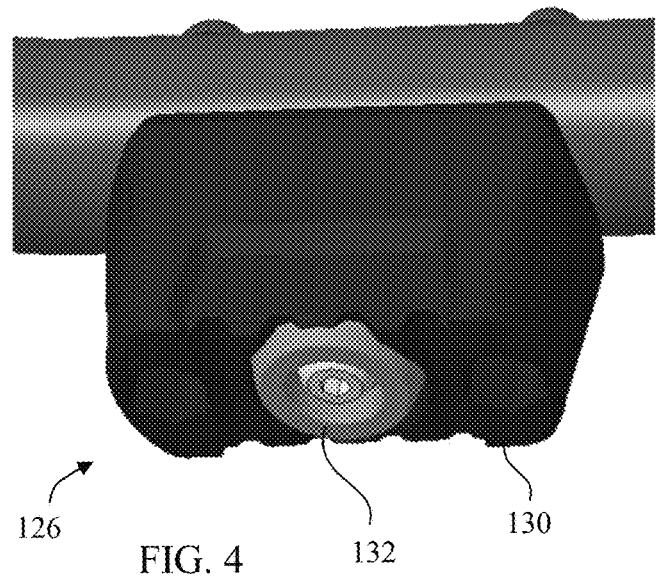
FIG. 4 shows a bottom perspective view of an anti-tip foot of the table saw assembly of FIG. 1.

Two support pads 122 and 124 are provided on the vertical stabilizer 120 and two anti-tip feet 126 and 128 are provided on the longitudinal support members 110 and 112, respectively. The anti-tip feet 126 and 128 are identical and are further described with respect to the anti-tip foot 126 shown in FIGS. 4 and 5.

Figure 5:
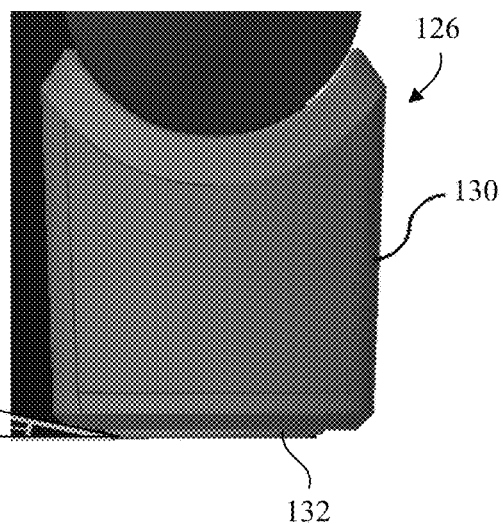
FIG. 5 shows a rear plan view of an anti-tip foot of the table saw assembly of FIG. 1.

The anti-tip foot 126 includes a hard plastic foot 130 and a soft rubber pad 132. As shown in FIG. 5, the soft rubber pad 132 is configured to extend downwardly farther than the hard plastic foot when the anti-tip foot is positioned on a surface. Accordingly, the soft rubber pad inhibits sliding of the stand 104. The lowermost portion of the soft rubber pad 132 and the lower most portion of the hard plastic foot 130, however, define an angle 134. In the event a force is applied to the stand 104 which causes tipping of the stand above the angle 134, the hard plastic foot 130 is brought into contact with the underlying surface and the soft rubber pad 132 is lifted off of the surface. Accordingly, the soft rubber pad 132 no longer inhibits slipping and the hard plastic foot 130 enables slipping. Consequently, the stand will slide across the surface rather than tip over. Moreover, by the incorporation of hard plastic, the use of metal, which can scratch soft surfaces such as wood floors, is avoided.

Returning to FIGS. 1 and 2, tube stops 134 and 136 are provided on the longitudinal support members 110 and 112 respectively. As will be discussed in further detail below, in some embodiments the tube stops 134 and 136 are alternatively provided as part of the coupling assembly 106. Curved protective plates 138 and 140 are also provided on the longitudinal support members 110 and 112 respectively. In addition to being pivotably mounted through the pivots 114 and 116 to the coupling assembly 106, the longitudinal support members 110 and 112 are pivotably connected to lower support members 142 and 144, respectively, through pivots 146 and 148, respectively.

The lower support members 142/144, which are joined by a wheel support member 150 (see FIG. 6) are rotatably connected to wheels 152 and 154. In some embodiments, two or more of the lower support members 142/144 and wheel support member 150 are separately formed. The lower support members 142/144 include lower legs 156/158 and upper legs 160/162, respectively. The wheel support member 150 joins the lower support members 142/144 at a lower portion of the lower legs 156/158. The upper legs 160/162 extend from the lower legs 156/158 at a non-zero angle in a direction toward the coupling assembly 106 when the stand is in the open position shown in FIG. 2. The pivots 146 and 148 which pivotably couple the lower support members 142/144 to the longitudinal support members 110/112, respectively, are operably connected to the upper legs 160/162, respectively.

Also operably connected to the upper legs 160/162 are pivots 164/166 (see FIG. 2) which pivotably connect the lower support members 142/144 to intermediate support members 168/170 (see, also, FIG. 7), respectively. More specifically, the pivots 164/166 are operably connected to upper arms 172/174 of the intermediate support members 168/170, respectively. The upper arms 172/174 are connected to lower arms 176/178, respectively, which are shown more clearly in FIG. 7. Locking pins 180/182 extend from the lower arms 176/178, respectively. The upper arms 172/174 extend at a non-zero angle from the lower arms 176/178, respectively in a direction toward the table saw coupling assembly 106 when the stand 104 is in the open position of FIG. 2.

Figure 7:
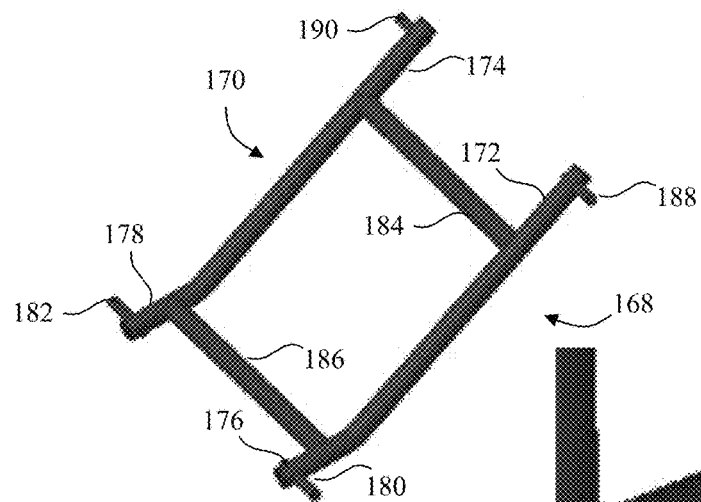
FIG. 7 shows a side perspective view of the intermediate support members of the table saw assembly of FIG. 1.

The intermediate support members 168/170 are joined by upper crossbar 184 and lower crossbar 186. In the embodiment of FIG. 7, the intermediate support members 168/170, locking pins 180/182, and crossbars 184/186 are integrally formed. In other embodiments, one or more of the intermediate support members 168/170, locking pins 180/182, and crossbars 184/186 are separately formed. The intermediate support members 168/170 are also pivotably connected to the coupling assembly 106 through pivots 188/190, respectively. The pivots 188/190 are operably connected to the upper arms 172/174, respectively.

Figure 8:
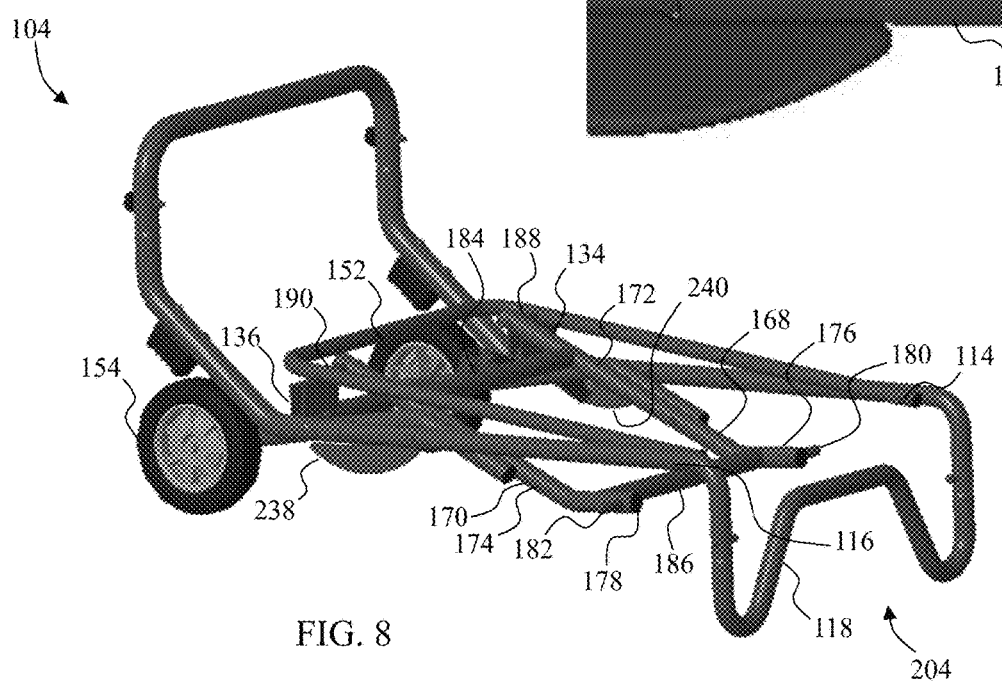
FIG. 8 shows a side perspective view of the table saw assembly of FIG. 1 with the stand in a closed horizontal configuration with the table saw removed for clarity.

Further details regarding the table saw assembly 100 including operation of the stand 104 are described with initial reference to FIG. 8. In FIG. 8, which shows the table saw assembly 100 with the table saw 102 removed for clarity, the stand 104 is in a closed horizontal position. In the closed horizontal position, the table saw assembly 100 is supported on a surface with the wheels 152/154 and the W-shaped handle 118. In addition to support provided through the pivots 114, 116, 188, and 190, the coupling assembly 106 is supported in the closed horizontal position by the tube stops 134/136. The tube stops are similarly configured and are described in more detail with reference to tube stop 136 as shown in FIGS. 2 and 9.

Figure 2:
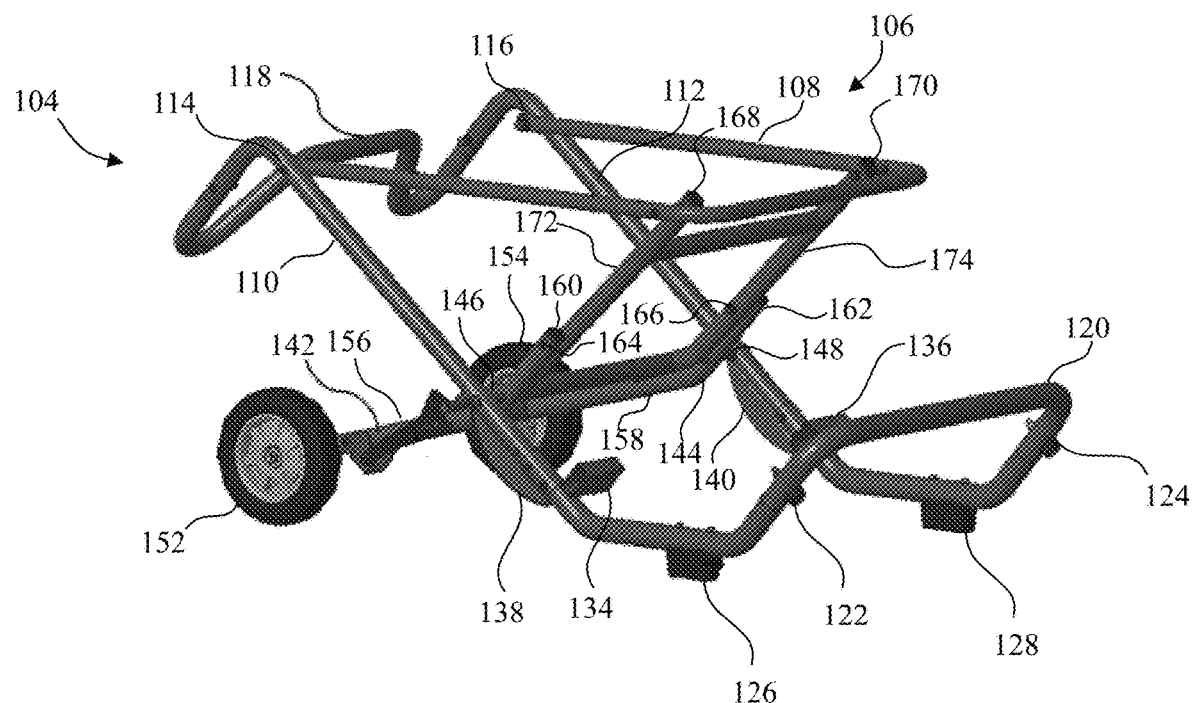
FIG. 2 shows a side perspective view of the table saw assembly of FIG. 1 with the table saw removed for clarity.

As shown in FIG. 2, the tube stop 136 is rigidly attached to the longitudinal support member 112. The tube stop 136 is configured to extend inwardly in a direction toward the longitudinal support member 110. Accordingly, when the stand is in the closed horizontal configuration of FIG. 8, the tube stop 136 is positioned directly between the coupling assembly 106 and the lower leg 158.

Figure 9:
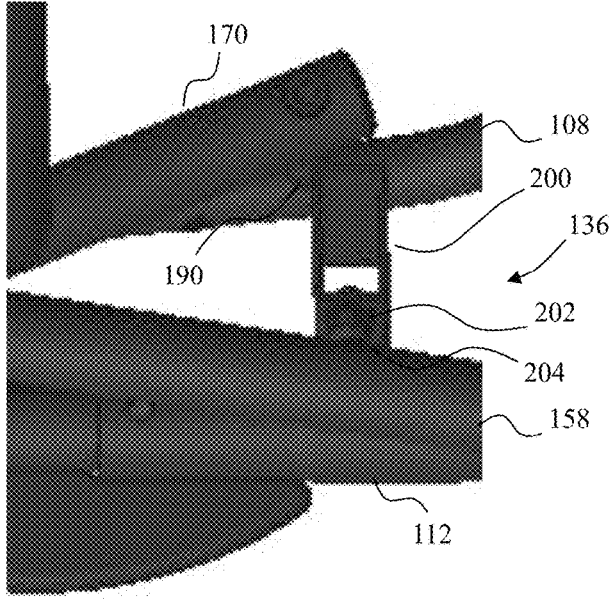
FIG. 9 shows a bottom perspective view of a tube stop of the table saw assembly of FIG. 1.

In particular, the tube stop 136 includes a rectangular tube portion 200, which is shown in FIG. 9, which is welded to the longitudinal support member 112. An upper surface of the rectangular tube portion 200 is configured to contact the coupling assembly 106. At a lower portion of the rectangular tube portion 200 a nut 202 is welded to the rectangular tube portion 200. A bolt 204 extending through the nut 202 thus sets a precise spacing of the coupling assembly 106 and the lower leg 158, and thus the other support members of the stand 104. This provides increased strength such that the stand is not over-compressed in the event that additional loading is applied to the table saw when the stand is in the closed horizontal position. In some embodiments, the tube stop is alternatively mounted to one of the intermediate support member and the table saw coupling assembly.

With reference to FIG. 8, in order to move the table saw assembly 100, a user grasps the W-shaped handle 118. Because of the design of the W-shaped handle 118, when the stand is in the closed horizontal position, the W-shaped handle 118 provides an elevated portion 204 (see FIG. 8). Consequently, a user does not need to reach down as far to grab the W-shaped handle 118. The W-shaped handle is then used to pivot the stand 104 about the wheels 152/154 so that the table saw assembly 100 can be maneuvered using the wheels 152/154.

Figure 6:
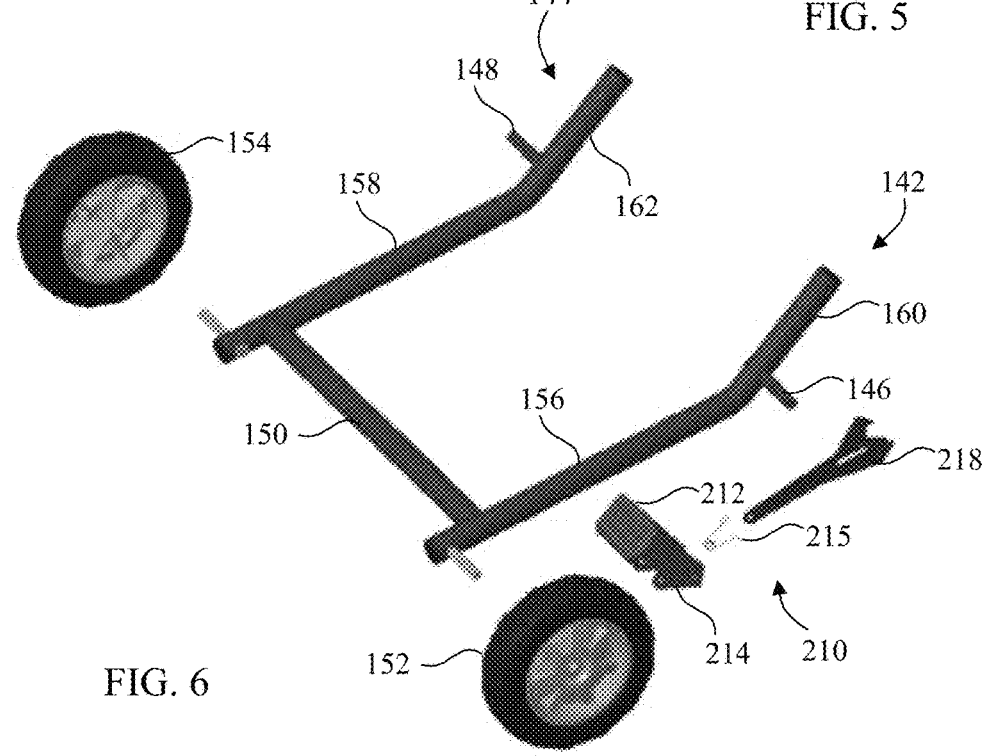
FIG. 6 shows an exploded view of the lower support members, latch assembly, and wheels of the table saw assembly of FIG. 1.

To assist in safely moving the table saw assembly 104, the table saw assembly is locked in the closed position using a latching assembly 210 which is described with reference to FIGS. 6, 10, and 11. The latching assembly 210 includes a foot pedal 212 which is rigidly connected to a connecting plate 214 such that pivoting of the foot pedal 212 causes pivoting of the connecting plate 214. The foot pedal 212 and connecting plate 214 are pivotably connected to the lower support member 142 through a pivot 216. The foot pedal 212 and connecting plate 214 are biased to place the latching assembly 210 in a locking position shown in FIG. 10 by a spring 215 (see FIG. 6) or other biasing member between the foot pedal 212 and connecting plate 214 and the lower support member 142. The biasing force acts in a counter-clockwise direction about the pivot 216 in the view shown in FIG. 10. Mounting of the foot pedal 212 within the footprint of the wheel support member 150 protects the foot pedal 212 from accidental activation.

Figure 10:
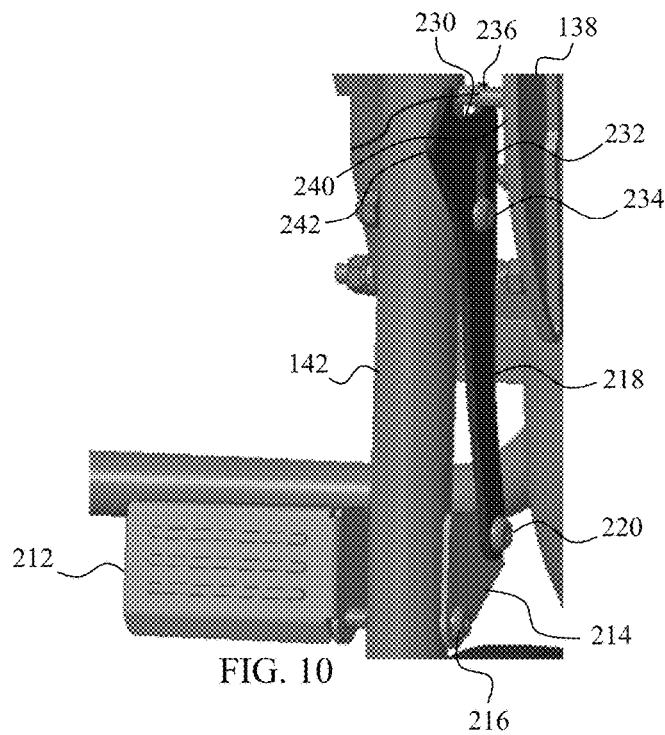
FIG. 10 shows a rear perspective view of the latching assembly of the table saw assembly of FIG. 1.
Figure 11:
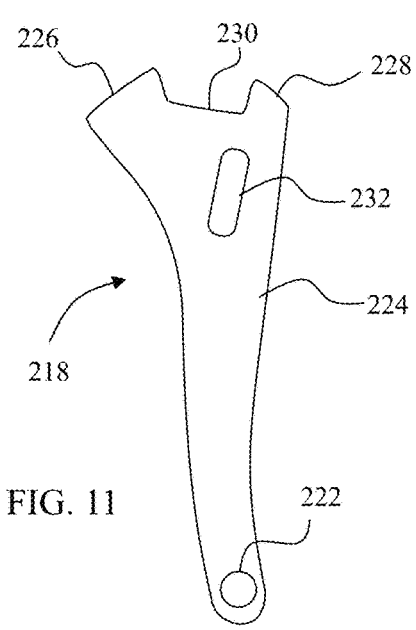
FIG. 11 shows a side plan view of the latch of the latching assembly of FIG. 10.

Continuing with FIG. 10, the connecting plate 214 is pivotably connected to a latch 218 through a pivot 220 which in this embodiment is a screw. The screw/pivot 220 rotatably extends through pivot bore 222 in the body 224 of the latch 218 which is shown in FIG. 11. The latch 218 includes an activation surface 226, an activation surface 228, and a receiving groove 230. The body 224 further includes a slot 232. The latch 218 is slidably mounted to the lower support member 142 by a screw 234 fixedly connected to the lower support member 142 (see FIG. 10).

When the stand is in a closed position such as the closed horizontal position shown in FIG. 8, a locking pin 236 is positioned within the receiving slot 230. The locking pin 236 is fixedly connected to the longitudinal support member 110. Accordingly, the stand is locked in the closed position. Therefore, a user can maneuver the table saw assembly 100 without the stand 104 moving to an open position. Moreover, the curved protective plates 138/140 are configured such that when the stand is in the closed horizontal position of FIG. 8, a curved lower edge of each of the protective plates (see, e.g., curved edges 238 and 240) extends farther downwardly than a lowermost portion 242 (see FIG. 10) of the locking latch 218. This provides protection for the latch assembly 210 when the stand is in the closed position, and provides protection from accidental operation of the latch assembly 201. The curved edges 238 and 240 further provide a smooth rounded surface that will slide easily when the table saw assembly 100 is loaded into a vehicle or moving along stairs.

Figure 12:
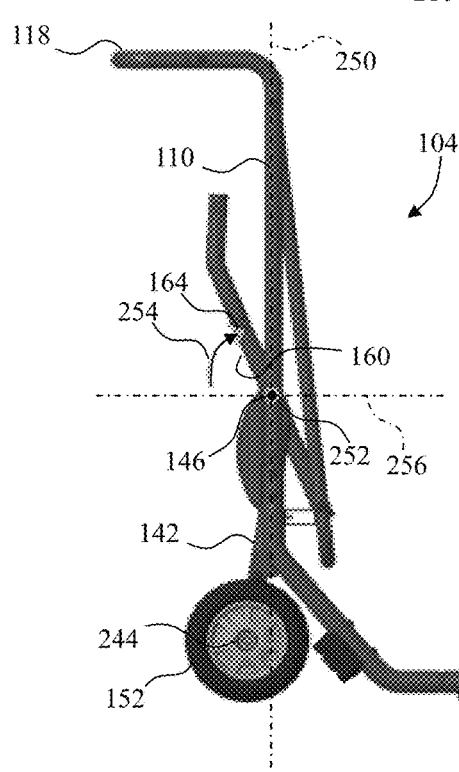
FIG. 12 shows a side plan view of the table saw assembly of FIG. 1 with the table saw removed for clarity and the stand in closed upright configuration.

To position the table saw assembly 100 for operation once the table saw assembly 100 has been transported to a desired location, the table saw assembly 100 is moved from the closed horizontal position of FIG. 8 to a closed upright position as depicted in FIG. 12. To move from the horizontal closed position to the vertical closed position of FIG. 12 a user lifts the W-shaped handle while using the wheels 152/154 as pivots, until the vertical stabilizer 120 contacts an underlying surface. More specifically, the support pads 122/124 come into contact with the underlying surface. Stability of the table saw assembly 100 is provided by the latching assembly 210 during this movement which precludes opening of the stand 104.

In the closed upright position of FIG. 12, the vertical stabilizer 120, along with the wheels 152/154, maintains the table saw assembly 100 in a stable vertical position so long as the locking pin 236 is maintained within the groove 230 of the latch 218. In the locked upright closed position of FIG. 12 the wheel axles (see, e.g., wheel axle 244 of wheel 152) are located to the left of a vertical plane 250 in which a pivot axis 252 of the pivots 146 and 148 extends. The pivots 164 and 166 are also located to the left of the vertical plane 250. Additionally, the table saw 102 (not shown in FIG. 12) is located to the right of the vertical plane 250 in a substantially vertical position. Thus, the weight of the table saw 102 acting through the pivots 146/148 and the axle(s) 244 provides a force tending to push the wheels 152/154 in a leftwardly direction. The latching assembly 210, however, prevents this movement.

When the user desires to move the table saw assembly into an open position, the user depresses the foot pedal 212 (see FIGS. 6 and 10) which acts against the biasing force of the spring 215 causing the connecting plate 214 to rotate in a clockwise direction (in the view of FIG. 10). Pivoting of the connecting plate 214 causes the latch 218 to move downwardly guided by the screw 234 within the slot 232 until the locking pin 236 is no longer within the receiving groove 230.

Once the locking pin 236 is no longer within the receiving groove 230, relative movement between the longitudinal support member 110 and the lower support member 142 is no longer constrained. Consequently, the force resulting from the weight of the table saw 102 causes the lower support members 142/144 to automatically pivot about the longitudinal support members 110/112, respectively by way of the pivots 146/148 respectively as the wheels 152/154 move away from the vertical plane 250. Once the locking pin 236 is no longer aligned with the receiving groove 230, the user removes the user force from foot pedal 212 and the spring 215 causes the connecting plate 214 (and foot pedal 212) to rotate in a counter-clockwise direction (in the view of FIG. 6). Counter-clockwise pivoting of the connecting plate 214 causes the latch 218 to move upwardly guided by the screw 234 within the slot 232 to the locking position shown in FIG. 10 (but without the locking pin 236 in the groove 230).

The pivoting of the lower support members 142/144 about the pivots 146/148 cause the upper legs 160/162 to pivot in a clockwise direction as indicated by the arrow 254 in FIG. 12. The automatic movement of the table saw assembly away from the closed upright position continues until the table saw assembly reaches an intermediate position shown in FIG. 13 at which point the automatic movement of the table saw assembly 100 ceases.

Figure 13:
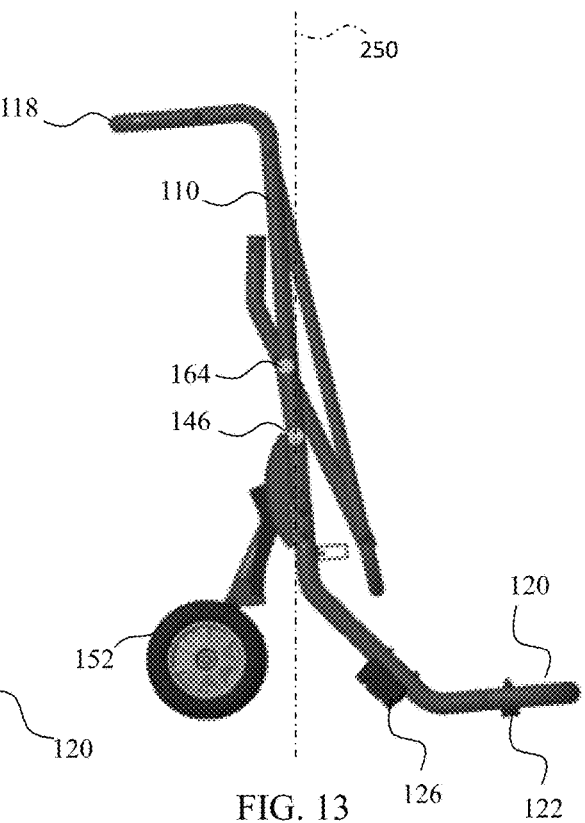
FIG. 13 shows a side plan view of the table saw assembly of FIG. 1 with the table saw removed for clarity and the stand in an intermediate configuration.

The table saw assembly 100 is rotationally stable in the intermediate position of FIG. 13 whereat the table saw is in a less vertical orientation compared to the configuration of FIG. 12 because the pivots 164/166 have moved to a location immediately adjacent to or in line with the vertical plane 250 as the center of gravity of the table saw has moved toward the vertical plane 250. With the pivots 164/166 and the pivots 146/148 stacked in this manner, the table saw assembly 100 is stable. To continue from the intermediate position of FIG. 13 the user simply presses downwardly on the W-shaped handle 118. This additional force allows the table saw assembly 100 to continue toward the open position shown in FIG. 2.

Specifically, as the W-shaped handle 118 moves downwardly under the force provided by the user, the longitudinal support members 110/112 rotate leftwardly and contact with the underlying support surface shifts from the support pads 122/124 to the anti-tip feet 126/128. In some embodiments, the support pads 122/124 and the anti-tip feet 126/128 are configured to simultaneously be in contact with the underlying support surface. In other embodiments, contact moves from the support pads 122/124 to the connections between the vertical stabilizer 120 and the longitudinal support members 110/112. The wheels 152/154 continue to move away from the vertical plane 250 throughout the change in contact from the support pads 122/124 to the anti-tip feet 126/128.

As the table saw assembly continues to move toward the open positon of FIG. 2, the locking pin 180 comes into contact with the activation surface 226 of the latch 218. This contact presses the latch 218 downwardly causing the connecting plate 214 to rotate against the biasing force of the spring 215. This movement continues until the locking pin 180 moves into the groove 230 at which time the spring 215 causes the connecting plate 214 (and foot pedal 212) to rotate in a counter-clockwise direction (in the view of FIG. 10). Counter-clockwise pivoting of the connecting plate 214 causes the latch 218 to move upwardly guided by the screw 234 within the slot 232 thereby locking the locking pin 180 within the receiving groove 230.

At or about the same time as the locking pin 180 is being locked by the latch 218, the locking pins 180/182 also move into contact with the lower support members 140/142. Further movement away from the intermediate position of FIG. 13 is thereby terminated and the table saw assembly 100 is in the open position of FIG. 2 with the table saw in a substantially horizontal configuration. Accordingly, the table saw 102 is in position for use. The user may then use the table saw 102 as desired.

When the user desires to place the table saw assembly 100 in a closed position from the open position of FIG. 2, the user pivots the foot pedal 212 in a clockwise direction (as viewed in FIG. 10) by overcoming the biasing force of the spring 215. The clockwise pivoting of the foot pedal 212 causes the connecting plate 214 to pivot in a clockwise direction about the pivot 216 thereby forcing the latch 218 downwardly. Once the latch 218 has moved downwardly to a sufficient extent, the locking pin 180 is no longer constrained within the groove 230. The user then lifts upwardly with the W-shaped handle 118. This causes the longitudinal support members 110 and 112 to pivot on the hard anti-tip feet 126/128 and the wheels 152/154 begin to move toward the vertical plane 250 due to the weight of the table saw 102 acting through the intermediate support members 168/170 and the pivots 164/166.

As the user continues to lift the W-shaped handle 118, contact with the underlying support surface moves from the anti-tip feet 126/128 to the support pads 122/124 in a manner opposite that described above with respect to movement to the open position of FIG. 2 and the table saw assembly 100 comes to the intermediate position of FIG. 13. From the intermediate position of FIG. 13, the user pushes the W-shaped handle 118 in a forward direction toward the vertical plane 250 allowing the wheels 152/154 to move closer to the vertical plane 250.

As the wheels 152/154 move closer to the vertical plane 250, the locking pin 236 which is fixedly connected to the longitudinal support member 110 contacts the activation surface 228 of the latch 218. This forces the latch 218 downwardly causing the connecting plate 214 to rotate against the biasing force of the spring 215. This movement continues until the locking pin 236 moves into the groove 230 at which time the spring 215 causes the connecting plate 214 (and foot pedal 212) to rotate in a counter-clockwise direction (in the view of FIG. 10). Counter-clockwise pivoting of the connecting plate 214 causes the latch 218 to move upwardly guided by the screw 234 within the slot 232 thereby locking the locking pin 236.

At or about the same time as the locking pin 236 is being locked by the latch 218, the tube stops 134/136 move into contact with the coupling assembly 106 and the lower support member 150 (see FIG. 9). Further movement away from the intermediate position of FIG. 13 is thereby terminated and the table saw assembly 100 is in the closed upright position of FIG. 12 with the table saw in a substantially vertical configuration. Accordingly, the table saw assembly 100 can be safely moved as desired.

The configuration of the stand 104 thus provides for automatic movement from the closed upright position of FIG. 12 to the intermediate position of FIG. 13 using two pivot axes. One pivot axis is defined by the pivots 146/148 and the other pivot axis is defined by the pivots 164/166. Optimally, the pivot axis defined by the pivots 164/166 is positioned at a distance x from the vertical plane 250 when the stand 104 is in a closed upright position, wherein $0.25"\geq x\leq 3"$. The pivot axis defined by the pivots 164/166 is positioned at a distance y from a horizontal plane 256 in which the pivot axis 252 extends when the stand 104 is in a closed upright position, wherein $1.0"\geq y\leq 6"$. The geometry created by these distances is such that when the stand is in the closed position and the foot pedal is pressed, the weight of the saw causes the automatic movement to the stable intermediate position of FIG. 13, requiring less effort from the user to open the stand.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A table saw system, comprising:
   a table saw; and
   a stand configured to support the table saw, the stand including
   a table saw coupling assembly configured to couple with the table saw,
   an intermediate support member pivotably coupled to the table saw coupling assembly through at least one first pivot,
   a lower support member pivotably coupled to the intermediate support member through at least one second pivot, and
   a longitudinal support member pivotably connected to the table saw coupling assembly through at least one third pivot, and pivotably connected to the lower support member through at least one fourth pivot,
   wherein
   the stand is movable between a closed upright position whereat the table saw is generally vertically oriented, an open position whereat the table saw is generally horizontally oriented, and an intermediate position from which the stand is alternatively movable to either of the closed upright position and the open position without passing through the other of the closed position and the open position,
   the table saw is generally vertically oriented in the intermediate position, the at least one second pivot is closer to a vertical plane in which a pivot axis of the at least one fourth pivot extends when the stand is in the intermediate position than when the stand is in the closed upright position, and the stand is configured to move from the closed upright position to the intermediate position automatically when the table saw is coupled to the table saw coupling assembly.

2. The table saw system of claim 1, wherein when the stand is in the closed upright position:

a minimum distance between the at least one second pivot and a vertical plane extending through the fourth pivot is ≥0.25 inches and ≤3 inches; and a minimum distance between a horizontal plane extending through the at least one second pivot and a horizontal plane extending through the at least one fourth pivot is ≥1 inch and ≤6 inches.

3. The table saw system of claim 2, further comprising:

a tube stop assembly mounted on one of the lower support member, the intermediate support member, and the table saw coupling assembly, the tube stop assembly configured to abut the other two of the lower support member, the intermediate support member, and the table saw coupling assembly when the stand is in a closed horizontal position.

4. The table saw system of claim 3, wherein the tube stop assembly comprises a stop bolt configured to contact one of the intermediate support member, and the table saw coupling assembly when the stand is in the closed horizontal position.

5. The table saw assembly of claim 3, wherein the intermediate support member has a first end portion and a second end portion opposite the first end portion, the table saw assembly further comprising:

a locking pin at the second end portion of the intermediate support member;

a locking latch slidably connected to the lower support member; and a foot actuator pivotably connected to the lower support member and the locking latch, wherein the locking pin and locking latch are configured to automatically lock the stand when the stand is moved to the open position, the foot actuator is configured to unlock the locking pin and locking latch when the foot actuator is moved from a first position to a second position, and the locking pin is configured to contact the lower support member in the open position.

6. The table saw assembly of claim 5, further comprising:

a protective plate mounted on the longitudinal support, wherein the protective plate is configured such that when the stand is in a closed horizontal position a lower edge of the protective plate extends farther downwardly than a lowermost portion of the locking latch, and the lower edge is rounded.

7. The table saw assembly of claim 6, further comprising:

at least one wheel rotatably connected to the lower support member.

8. The table saw assembly of claim 6, further comprising:

a vertical stabilizer extending from the longitudinal support, the vertical stabilizer configured to maintain the stand in a vertical condition when the stand is in the closed upright position and the intermediate position.

9. The table saw assembly of claim 8, wherein:

the lower support member includes a lower leg and an upper leg;

the second and fourth pivots are operably connected to the upper leg;

when the stand is in the open position, the upper leg extends at a non-zero angle from the lower leg in a direction toward the table saw coupling assembly;

the intermediate support member includes an upper arm and a lower arm the first and second pivots are operably connected to the upper arm; and when the stand is in the open position, the upper arm extends at a non-zero angle from the lower arm in a direction toward the table saw coupling assembly.

10. The table saw assembly of claim 1, further comprising:

a latching assembly movable between a locking position and an unlocked position, wherein the stand is configured to move from the closed upright position to the intermediate position automatically when the table saw is coupled to the table saw coupling assembly and the latching assembly is moved from the locking position to the unlocked position.

11. The table saw assembly of claim 10, wherein the intermediate support member has a first end portion and a second end portion opposite the first end portion, the latching assembly comprising:

a locking pin at the second end portion of the intermediate support member;

a locking latch slidably connected to the lower support member; and a foot actuator pivotably connected to the lower support member and the locking latch.

12. A stand for a power tool, comprising:

a power tool coupling assembly configured to couple with the power tool;

an intermediate support member pivotably coupled to the power tool coupling assembly through at least one first pivot;

a lower support member pivotably coupled to the intermediate support member through at least one second pivot; and a longitudinal support member pivotably connected to the power tool coupling assembly through at least one third pivot, and pivotably connected to the lower support member through at least one fourth pivot, wherein the stand is configured to be movable between a closed upright position whereat the power tool, when coupled to the stand, is generally vertically oriented, an open position whereat the power tool, when coupled to the stand, is generally horizontally oriented, and an intermediate position from which the stand is alternatively movable to either of the closed upright position and the open position without passing through the other of the closed position and the open position, the stand is configured such that the power tool, when coupled to the stand, is generally vertically oriented in the intermediate position, the at least one second pivot is closer to a vertical plane in which an axis of the at least one fourth pivot extends when the stand is in the intermediate position than when the stand is in the closed upright position, and the stand is configured to move from the closed upright position to the intermediate position automatically when the power tool is coupled to the power tool coupling assembly.

13. The stand of claim 12, wherein when the stand is in the closed upright position:
   a minimum distance between the at least one second pivot and a vertical plane extending through the fourth pivot is ≥0.25 inches and ≤3 inches; and
   a minimum distance between a horizontal plane extending through the at least one second pivot and a horizontal plane extending through the at least one fourth pivot is ≥1 inch and ≤6 inches.

14. The stand of claim 13, further comprising:
   a tube stop assembly mounted on one of the lower support member, the intermediate support member, and the table saw coupling assembly, the tube stop assembly configured to abut the other two of the lower support member, the intermediate support member, and the table saw coupling assembly when the stand is in a closed horizontal position.

15. The stand of claim 14, wherein the tube stop assembly comprises a stop bolt configured to contact one of the intermediate support member, and the table saw coupling assembly when the stand is in the closed horizontal position.

16. The stand of claim 14, wherein the intermediate support member has a first end portion and a second end portion opposite the first end portion, the stand further comprising:
   a locking pin at the second end portion of the intermediate support member;
   a locking latch slidably connected to the lower support member; and
   a foot actuator pivotably connected to the lower support member and the locking latch, wherein
   the locking pin and locking latch are configured to automatically lock the stand when the stand is moved to the open position,
   the foot actuator is configured to unlock the locking pin and locking latch when the foot actuator is moved from a first position to a second position, and
   the locking pin is configured to contact the lower support member in the open position.

17. The stand of claim 16, further comprising:
   a protective plate mounted on the longitudinal support, wherein
      the protective plate is configured such that when the stand is in a closed horizontal position a lower edge of the protective plate extends farther downwardly than a lowermost portion of the locking latch, and
      the lower edge is rounded.

18. The stand of claim 17, wherein:
the lower support member includes a lower leg and an upper leg;
the second and fourth pivots are operably connected to the upper leg;
when the stand is in the open position, the upper leg extends at a non-zero angle from the lower leg in a direction toward the power tool coupling assembly;
the intermediate support member includes an upper arm and a lower arm
the first and second pivots are operably connected to the upper arm; and
when the stand is in the open position, the upper arm extends at a non-zero angle from the lower arm in a direction toward the power tool coupling assembly.

19. The stand of claim 12, further comprising:
   a latching assembly movable between a locking position and an unlocked position, wherein the stand is configured to move from the closed upright position to the intermediate position automatically when the power tool is coupled to the power tool coupling assembly and the latching assembly is moved from the locking position to the unlocked position.

20. The table saw assembly of claim 19, wherein the intermediate support member has a first end portion and a second end portion opposite the first end portion, the latching assembly comprising:
   a locking pin at the second end portion of the intermediate support member;
   a locking latch slidably connected to the lower support member; and
   a foot actuator pivotably connected to the lower support member and the locking latch.

* * * * *